(12) United States Patent
Takahashi

(10) Patent No.: US 6,718,264 B2
(45) Date of Patent: Apr. 6, 2004

(54) METHOD FOR ACQUIRING AZIMUTH INFORMATION

(75) Inventor: Masato Takahashi, c/o Communications Research Laboratory, Independent Administrative Institution, 4-2-1 Nukui-kitamachi, Koganei-shi, Tokyo (JP)

(73) Assignees: Communications Research Laboratory, Independent Administrative Institution, Koganei (JP); 90% interest; Masato Takahashi, Koganei (JP); 10 % interest ( * ) Notice: Subject to any disclaimer, the term of this patent is extended or adjusted under 35 U.S.C. 154(b) by 37 days.

(21) Appl. No.: 10/105,315

(22) Filed: Mar. 26, 2002

(65) Prior Publication Data

US 2002/0183926 A1 Dec. 5, 2002

(30) Foreign Application Priority Data

Mar. 25, 2001 (JP) .................... 2001-093965

(51) Int. Cl.$^7$ .............................. G01S 13/87
(52) U.S. Cl. .................... 701/213; 701/215; 342/1; 342/73
(58) Field of Search .............. 701/213, 200, 701/215; 73/178 R; 342/1, 73

(56) References Cited

U.S. PATENT DOCUMENTS

| | | |
|---|---|---|
| 5,144,318 A | 9/1992 | Kishi |
| 5,185,610 A | 2/1993 | Ward et al. |
| 5,341,301 A | 8/1994 | Shirai et al. |
| 5,430,654 A | 7/1995 | Kyrtsos et al. |
| 5,471,218 A | 11/1995 | Talbot et al. |
| 5,920,278 A * | 7/1999 | Tyler et al. ............ 342/33 |
| 6,018,315 A | 1/2000 | Ince et al. |

FOREIGN PATENT DOCUMENTS

| | | |
|---|---|---|
| DE | 35 22 880 | 1/1986 |
| DE | 40 02 176 | 8/1990 |
| DE | 41 42 403 | 7/1992 |
| DE | 43 40 954 | 6/1994 |
| DE | 44 15 083 A1 | 11/1995 |
| EP | 0 437 372 | 7/1991 |
| JP | 61-016634 | 1/1986 |

OTHER PUBLICATIONS

Edited by Bradford W. Parkinson et al., Published by the American Institute of Aeronautics and Astronautics, Inc., vol. 1, pp. 342–343, and 722+723 "Global Positioning System: Theory and Applications", 1996.

M. Haneishi, et al., Published by the Institute of Electronics, Information and Communication Engineers, pp. 100–101, "Small Plane Antennas", Aug. 10, 1996 (reference is in Japanese, please see Statement of Relevancy).

* cited by examiner

Primary Examiner—William A. Cuchlinski, Jr.
Assistant Examiner—Olga Hernandez
(74) Attorney, Agent, or Firm—Oblon, Spivak, McClelland, Maier & Neustadt, P.C.

(57) ABSTRACT

A method for acquiring azimuth information is provided in which first and second planar patch antennas (11a, 11b) are disposed so that their sky coverage areas partially overlap to form a common area (2), thereby dividing the antenna sky coverage area into a first area (1), third area (3) and common second area 2, and an azimuth is limited utilizing azimuths acquired in the respective areas and the angle between the two antennas. As a result, azimuth limitation information can be effectively acquired even at a location where the sky is severely blocked and satellite information can be adequately acquired only at a small range of sky visibility.

4 Claims, 6 Drawing Sheets

METHOD FOR ACQUIRING AZIMUTH INFORMATION

BACKGROUND OF THE INVENTION

1. Field of the Invention

This invention relates to a method for acquiring azimuth information using signals transmitted from GPS (Global Positioning System) satellites.

2. Description of the Prior Art

Previously, positioning information such as latitude, longitude, altitude and GPS (Global Positioning System) time were readily obtainable from signals transmitted by GPS satellites but azimuth information could not be acquired.

The inventor therefore developed a method for acquiring azimuth information by use of a pair of planar patch antennas (Japanese Patent Application Nos. 2000-91362 and 2001-93964).

This method for acquiring azimuth information includes a step of disposing a pair of planar patch antennas back-to-back, parallel to each other and vertical, whereby each planar patch antenna forms a sky coverage area of antenna sensitivity that is a sky quarter-sphere in the direction the antenna faces; a step of causing receiver units connected to the respective antennas to extract strength values of all received GPS satellite signals; a step of discriminating based on a comparison of the extracted signal strength values the antenna in whose sky coverage area the GPS satellite that transmitted each signal is present; a step of arranging the results of the step of discriminating areas of satellite presence in a ring-like sequence; and a step of determining or limiting an azimuth of a measurement direction based on information contained in a ring-like discrimination results sequence.

In order to implement this method for acquiring azimuth information in a commercially available GPS receiver, the inventor further developed a GPS receiver including a data transmitting unit, a data receiving unit and a data processing unit (Japanese Patent Application No. 2000-364605).

This made it possible to readily acquire azimuth information by disposing a pair of planar patch antennas back-to-back, parallel to each other and vertical, disposing a pair of GPS receivers so that the data transmitting unit and data receiving unit of each GPS receiver faces the data receiving unit and data transmitting unit of the other, thereby enabling GPS satellite data received by one GPS receiver to be transmitted to the other GPS receiver, and processing the two sets of data with the data processing unit.

Azimuth information acquired from GPS satellite signals is more reliable than azimuth information acquired using a compass that is affected by magnetic fields.

However, the foregoing method for acquiring azimuth information proposed by the inventor requires two planar antennas to be disposed in parallel. Therefore, at a location where only a limited azimuth portion of the overall sky can be used because of the presence of high-rise buildings to the front or rear, it is difficult to obtain an azimuth limitation result that limits the measured direction to a relatively narrow azimuth range.

Moreover, the fact that in the earlier proposed method for acquiring azimuth information the two planar antennas have to be disposed in parallel makes them difficult to install at the nose of a land mobile unit with a streamlined nose.

The present invention was accomplished in light of the foregoing circumstances and has as an object to provide a method for acquiring azimuth information that enables acquisition of azimuth information provided that a sky coverage area enabling reception of a signal from at least one GPS satellite is available.

SUMMARY OF THE INVENTION

This invention achieves this object by providing a method for acquiring azimuth information comprising:
- a step of vertically disposing a pair of planar antennas each having a hemispherical antenna pattern at an angle to each other such that their sky coverage areas partially overlap;
- a step of detecting the angle formed between the antennas;
- a step of causing a GPS receiver connected to each antenna to attempt reception of signals transmitted by GPS satellites in its sky coverage area;
- a step of comparing the satellite signals acquired and discriminating in which of three separate sky coverage areas the satellite that transmitted each signal is present;
- a step of in each of the three areas creating a clockwise series of satellite azimuths and extracting the azimuth of the first term and the azimuth of the last term; and
- a step of limiting the azimuth of a direction based on the azimuth of the first term and the azimuth of the last term in at least one area and the angle formed between the two antennas.

Thus in the method for acquiring azimuth information according to the present invention, in a situation where blocking by a mountain, building or other such ground feature is pronounced, allocation of antenna sensitivity to the whole sky can be avoided and the foregoing tendency for the spread of the azimuth limitation result to be wide can be overcome to provide a more desirable azimuth limitation result.

Moreover, owing to the placement of the two planar antennas to form a certain angle in the method for acquiring azimuth information according to the present invention, the pair of antennas can be readily installed at the nose of a streamlined land mobile unit with the angle set to match that of the streamline form, so that azimuth information can be acquired during travel.

The above and other objects and features of the invention will become apparent from the following description made with reference to the drawings.

DESCRIPTION OF THE PREFERRED EMBODIMENT

Figure 1:
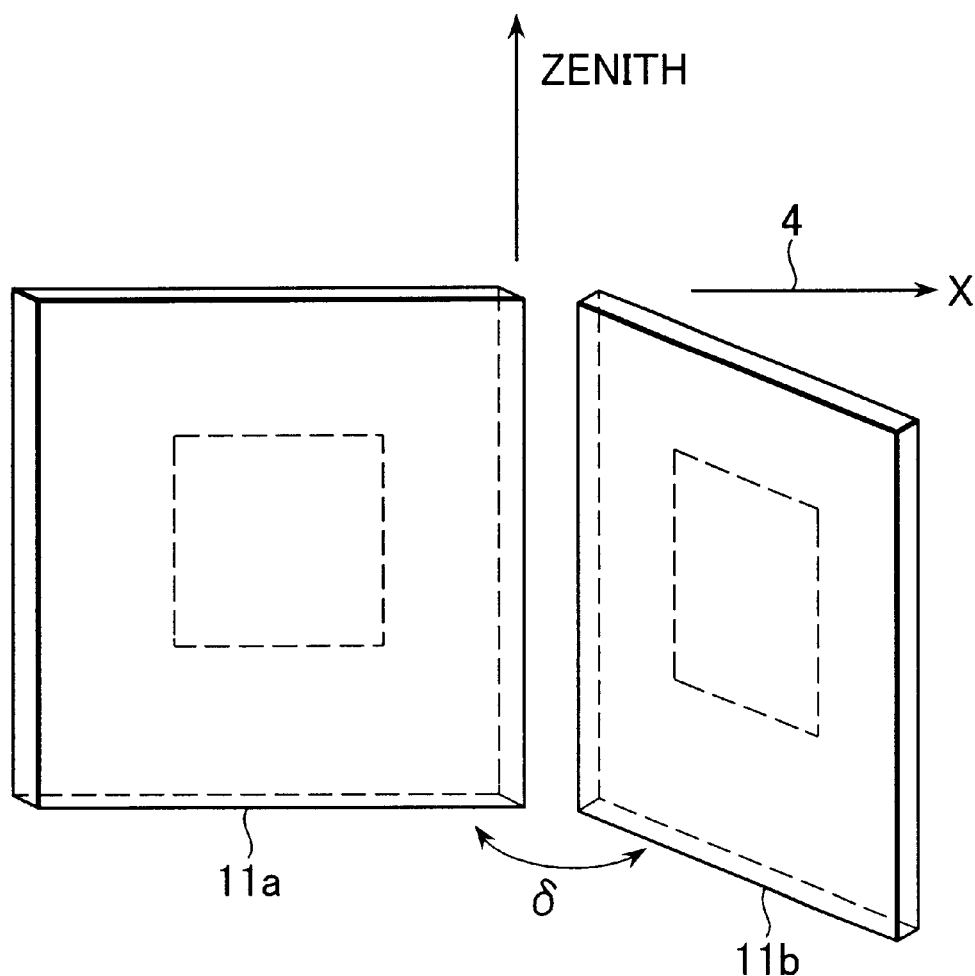
FIG. 1 is a diagram for explaining the placement of a pair of planar patch antennas in the method for acquiring azimuth information according the present invention.

The principle of the method for acquiring azimuth information of the invention will be explained first with reference to FIGS. 1 to 3.

Two planar patch GPS antennas 11a, 11b each having a hemispherical beam pattern are placed vertically (normal to the ground) to form an angle δ. The main beams of the antennas 11a, 11b as viewed in FIG. 1 face the back of the drawing sheet.

Major characteristics of the planar patch antennas used for the azimuth information acquisition include small size, light weight, ease of manufacture and low cost. In the actual fabrication of the first planar patch antenna 11a and the second planar patch antenna 11b, the completed antenna may have a right-handed circularly polarized wave beam pattern of a solid angle slightly broader than the hemisphere that is the circularly polarized wave beam pattern theoretically calculated at the time of design assuming an infinite ground plane. This occurs because the result of the design assuming an infinite ground plane in the theoretical calculation differs from the actual situation. This is discussed in the following literature references:

Small Plane Antennas: Misao Haneishi, Kazuhiro Hirasawa and Yasuo Suzuki Published by the Institute of Electronics, Information and Communication Engineers, Aug. 10, 1996, P100.

Global Positioning System: Theory and Applications Volume I Edited by Bradford W. Parkinson and James J. Spilker Jr. Published by the American Institute of Aeronautics and Astronautics, Inc. 1996, P342–P343, P722.

The technique of correcting such beam shape deviation by slightly modifying the substrate size, patch size or the like to obtain the desired antenna pattern, the desired hemispherical beam in the case at hand, is known as antenna pattern shaping.

When, differently from the sky hemisphere according to the design calculations, the fabricated result turns out to have a beam larger than the sky hemisphere, the desired sky hemispherical beam antenna can be easily configured by disposing a shielding substance composed of a radio wave shielding material on the rear side to eliminate the unwanted sensitivity portion.

The angle δ formed between the two antennas 11a, 11b is an angle that causes the coverage areas of the antennas to overlap partially to form a common coverage area. Specifically, as shown in FIG. 2, angle δ is defined so that the sky coverage area of the first planar patch antenna 11a consists of a first area 1 and a second area 2, and the sky coverage area of the second planar patch antenna 11b consists of the second area 2 and a third area 3. The second area 2 is therefore a common area covered by both antennas.

Defining the direction in which one end of the first planar patch antenna 11a (the end nearer the second planar patch antenna 11b) points as X, the opposite direction of first planar patch antenna 11a becomes the direction obtained by adding 180 degrees to X, the direction in which one end of the second planar patch antenna 11b (the end nearer the first planar patch antenna 11a) points becomes the direction obtained by subtracting the angle δ from X, and the opposite direction of the second planar patch antenna 11b becomes the direction obtained by adding 180 degrees to that direction.

Figure 3:
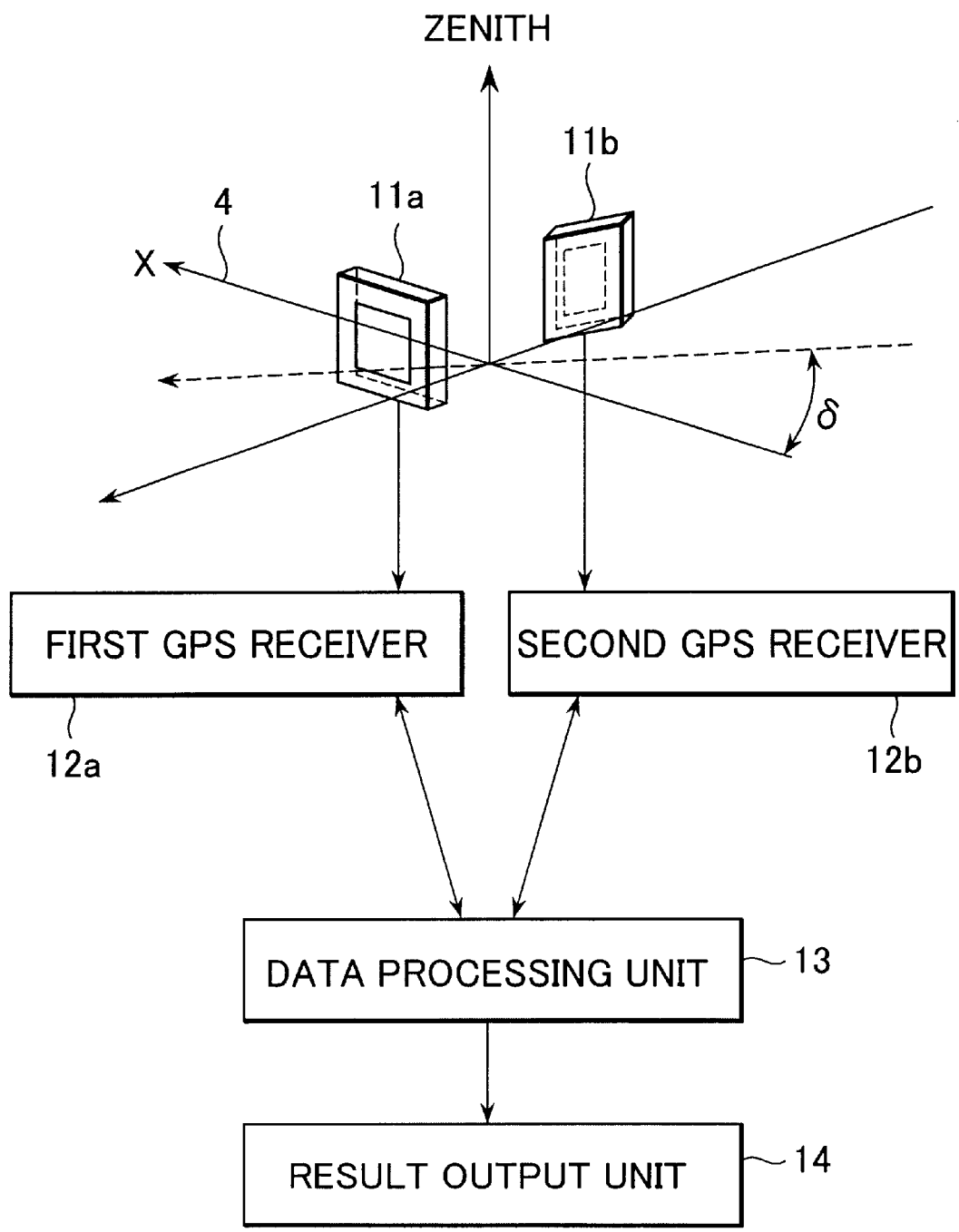
FIG. 3 is a block diagram of a system for implementing the method for acquiring azimuth information of the present invention.

As shown in FIG. 3, a first GPS receiver 12a is connected to the first planar patch antenna 11a and second GPS receiver 12b is connected to the second planar patch antenna 11b.

The first GPS receiver 12a attempts to utilize the first planar patch antenna 11a to synchronize with and decode signals from satellites present in the sky, and also to determine position. Similarly, the second GPS receiver 12b attempts to utilize the second planar patch antenna 11b to synchronize with and decode signals from satellites present in the sky, and also to determine position.

The first and second GPS receivers 12a and 12b shown in FIG. 3 can have the same functional features and specifications as the GPS receivers included in widely-used compact mobile positioning devices employing L1 signals. This makes it possible to take advantage of technologies developed for the production of small, light-weight consumer GPS positioning devices, most notably size reduction and ease of volume production. Thanks to size and weight reduction achieved in consumer GPS positioning devices, GPS receivers are abundantly available in sizes commensurate with planar patch antennas. They are also easy to manufacture. Moreover, these GPS receivers have planar patch antennas formed integrally with the receiver case, and inexpensive palm-sized models are already available. Production technologies are well established. The considerable store of miniaturization technologies available today can be utilized for economical fabrication of devices for implementing the present invention.

The GPS receiver periodically outputs the following data string at a period of, for example, once a second or shorter. In other words, it is built to ordinary specifications. Data such as the following are included in the data string: first, the current time, further, as positioning data, the latitude, longitude, altitude, positioning calculation time, positioning calculation mode (indicating whether two-dimensional positioning using three satellites or three-dimensional positioning using four satellites), the satellite number, satellite angle of elevation, satellite azimuth and channel state of the satellite assigned to channel 1, the satellite number, satellite angle of elevation, satellite azimuth and channel state of the satellite assigned to channel 2 . . . , and the satellite number, satellite angle of elevation, satellite azimuth and channel state of the satellite assigned to channel n. The number of used channels n is ordinarily 12. As the GPS receiver can concurrently synchronize with the signals of these 12 satellites, its specifications can be called ordinary by current standards. The present invention can utilize such an L1 wave GPS receiver and planar antenna available on the general market substantially without modification. The output of the first GPS receiver 12a is forwarded to a data processing unit 13.

The first GPS receiver 12a attempts to utilize the first planar patch antenna 11a to synchronize with and decode signals from satellites present in the sky, and also to determine position. Similarly, the second GPS receiver 12b attempts to utilize the second planar patch antenna 11b to synchronize with and decode signals from satellites present in the sky, and also to determine position. In other words, the first GPS receiver 12a and second GPS receiver 12b conduct a search for the signals from all GPS satellites expected to be present in the sky, just as does the GPS receiver of an ordinary mobile satellite positioning device, in exactly the same way as if connected with antennas whose coverage areas are the sky hemisphere.

The radio wave transmitted from a GPS satellite contains information on the orbits of all GPS satellites (almanac data). Every satellite transmits these data. Therefore, in the case of a satellite present in the sky at an angle of elevation of greater than 0 degree viewed from the current location but whose signal is blocked by a building or the topography, or of a satellite not in the antenna coverage area with whose signal synchronization cannot be established, the angle of elevation and azimuth of the satellite concerned can be computed and output by a simple calculation from data received from another GPS satellite with whose signal synchronization was established by one of the antennas. Equipment that outputs such information actually exists.

Although all GPS satellites transmit signals at exactly the same frequency, owing to the utilization of a technology called the spread spectrum communication system made possible by pseudo random coding, signal interference does not occur even when using the same frequency. In pseudo random coding, each GPS satellite is assigned a different digital signal sequence wherein 0 and 1 appear to alternate irregularly. This enables the signals from the satellites to be distinguished and separately received. In other words, the principle of pseudo random coding makes it easy to discriminate the angles of elevation in the sky and the azimuths of all GPS satellites present at an angle of elevation of greater than 0 degrees as viewed from the current location as well as to establish or not establish synchronization with the signals from the individual satellites, i.e., to differentiate the reception state and receive the signals from the satellites.

In the process of conducting the signal search with the GPS receiver, the data of each satellite, i.e., the satellite number, satellite angle of elevation, satellite azimuth and channel state of the GPS satellite, are periodically output by both GPS receivers. The positioning result data, i.e., the latitude, longitude, altitude, positioning calculation time, positioning calculation mode and current time, are also periodically output by both GPS receivers. There is no particular restriction on the data output period. GPS receivers that output data about once per second are currently in wide use. A shorter output period is also workable if available.

As a countermeasure when positioning cannot be established, the values at the most recent establishment of positioning calculation can be output as the latitude, longitude, altitude, positioning calculation time and positioning calculation mode data. Standard specification GPS receivers of the most ordinary type are capable of calculating satellite angle of elevation and satellite azimuth from satellite orbit factors utilizing the latitude, longitude and altitude at the time positioning calculation was most recently established, together with the current time. When such a GPS receiver is adopted, even under conditions that do not permit positioning to be established, satellite angle of elevation and satellite azimuth can still be very accurately calculated, provided that the most recent establishment of positioning calculation was at a nearby position, by using the results of the positioning calculation established at the nearby location. Assume, for example, that positioning calculation was established at a point 300 km from the current location. Even if the values obtained at that time are used together with the current time, it is still possible to make the calculation with very high accuracy, provided that the satellite azimuth and elevation were calculated, because the shift in the satellite angle of elevation and satellite azimuth will be very small (less than one degree). In other words, the error is negligible for practical purposes.

The data processing unit 13 first excludes the data of any GPS satellite for which the channel states of both GPS receivers indicate that synchronization has not been established. (Although the presence of such a satellite can be due to either blocking by ground features or the fact that the satellite is in a sky area to which the antennas are not sensitive, there is no need to distinguish between these two causes.) Next, the data of satellites whose satellite angle of elevation is 85 degrees or less are extracted. The reason for excluding satellites whose angles of elevation are greater than 85 degrees is that satellites with high angles of elevation near the zenith, while being observed to have azimuths that differ numerically, are very small in actual elongation.

The data processing unit 13 compares the remaining data of each GPS satellite and discriminates in which of the first area 1, second area 2 and third area 3 it is present.

When the state of the channel assigned to a signal transmitted by a satellite is found to be synchronized in the first GPS receiver 12a and the state of the channel assigned to the signal transmitted by the satellite is found not to be synchronized in the second GPS receiver 12b, the satellite is decided to be present in the first area 1.

When the state of the channel assigned to a signal transmitted by a satellite is found to be synchronized in the second GPS receiver 12b and the state of the channel assigned to the signal transmitted by the satellite is found not to be synchronized in the first GPS receiver 12a, the satellite is decided to be present in the third area 3.

When the state of the channel assigned to a signal transmitted by a satellite is found to be synchronized in the first GPS receiver 12a and the state of the channel assigned to the signal transmitted by the satellite is found to be synchronized in the second GPS receiver 12b, the satellite is decided to be present in the common second area 2.

The satellite azimuth output by the GPS receiver that indicates the more recent positioning calculation time is used in the following manner to process a satellite whose area has been determined.

The azimuths of the satellites present in the first, second and third areas are arranged in a clockwise series, and the data of the leading satellite (first term) and the final satellite (last term) of the series are extracted. If only one satellite is present in the area, it is processed by defining First term= Last term. If there are two or more satellites in the area, the first term and last term are defined as follows. Create a clockwise circular series with respect to the azimuths of only the satellites found to be present in the area. If the clockwise angle between the azimuth of a certain satellite (here called A) in the circular series and the azimuth of the next existing satellite in the clockwise direction (B) is greater than "the angle obtained by subtracting the central angle of the area from 360 degrees," define the satellite (A) as the last term and the satellite (B) as the first term.

Figure 2:
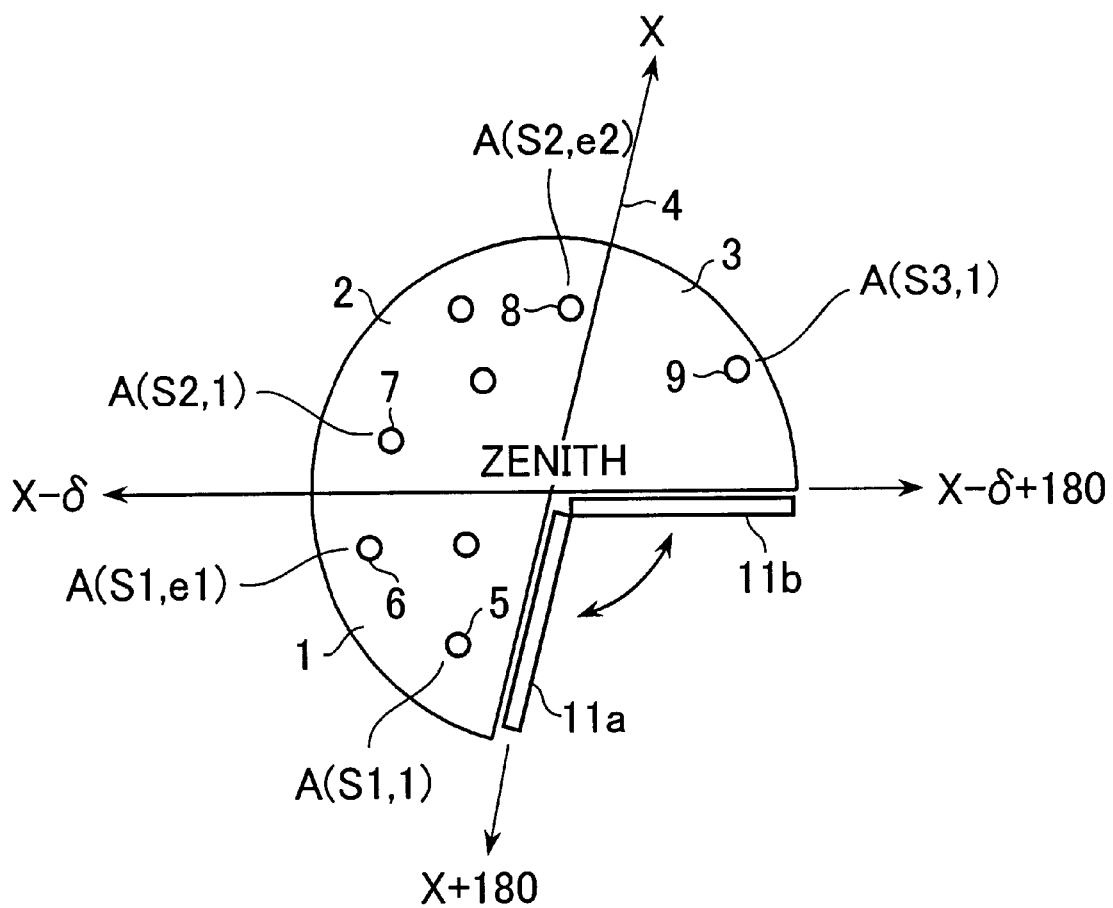
FIG. 2 is a diagram for explaining the sky coverage areas formed by each antenna of the pair of antennas placed as shown in FIG. 1.

When this is done, satellite 5 in FIG. 2 becomes the first term satellite and satellite 6 becomes the last term satellite of the first area 1. In the common (second) area 2, where four satellites are present, satellite 7 becomes the first term satellite and satellite 8 becomes the last term satellite. As satellite 9 is the only satellite present in third area 3, it becomes both the first and last term in this area.

A symbol like A(S1, 1) appearing next to a first term or last term satellite in FIG. 2 indicates the azimuth of the satellite in accordance with the following definition.

For example, in the symbol A(S1, 1) associated with the satellite 5, the symbol S1 on the left within the parentheses means that satellite 5 is in the series of satellites found in the first area 1 and the numeral 1 on the right indicates the position (ordinal number) of the term in the series. Thus, A(S1, 1) indicates the azimuth of the first term satellite in the series of satellites present in the first area 1. In the case of satellite 8, since the satellite is present in the second area 2, the symbol on the left in the parentheses is S2, while the symbol on the right is e2, which is assigned to indicate the position of the azimuth of the satellite in the clockwise direction in the area, i.e., that satellite 8 is the last term in the second area 2. (More specifically, since satellite 8 is the fourth satellite, e2=4.)

The following Equation (1) is therefore obtained from FIG. 2:

$$X+180<A(S1,1)<A(S1,e1)<X-\delta<A(S2,1)<A(S2,e2)<X<A(S3,1)<A(S3,e3)<X-\delta+180 \qquad \text{Eq. (1)}$$

The symbol "<" is used here to indicate that the order of azimuth appearance is clockwise.

The method of deriving from Eq. 1 an equation that limits the azimuth X based on the first term and the last term of the first area 1 will now be explained.

First, the first terms and last terms of areas other than first area 1 are omitted from Eq. 1 based on extractability.

$$X+180<A(S1,1)<A(S1,e1)<X-\delta<X<X-\delta+180 \qquad \text{Eq. (1-1)}$$

Based on add-subtract-ability, (180) is added to Eq. (1-1).

$$X<A(S1,1)+180<A(S1,e1)+180<X-\delta+180<X+180<X-\delta \qquad \text{Eq. (1-2)}$$

Similarly, based on add-subtract-ability, (δ) is added from Eq. (1-1).

$$X+\delta+180<A(S1,1)+\delta<A(S1,e1)+\delta<X<X+\delta<X+180 \qquad \text{Eq. (1.3)}$$

Based on connectivity, Eq. (1-2) and Eq. (1-3) are connected with respect to the X term and the X+180 term.

$$X+180<X+\delta+180<A(S1,1)+\delta<A(S1,e1)+\delta<X<A(S1,1)+180<A(S1,e1)+180<X-\delta+180 \qquad \text{Eq. (1-4)}$$

Based on extractability, all but the X term and adjacent terms are omitted from Eq. (1-4) to obtain Eq. (1-5), which limits the azimuth X by the first and last terms of the first area 1.

$$A(S1,e1)+\delta<X<A(S1,1)+180 \qquad \text{Eq. (1-5)}$$

Next, the method of deriving from Eq. (1) an equation that limits the azimuth X based on the first term and the last term of the second area 2 will be explained.

First, the first terms and last terms of areas other than the second area 2 are omitted from Eq. (1) based on extractability.

$$X+180<X-\delta<A(S2,1)<A(S2,e2)<X<X-\delta+180 \qquad \text{Eq. (2-2)}$$

Based on add-subtract-ability, (δ) is added to Eq. (2-2).

$$X+\delta+180<X<A(S2,1)+\delta<A(S2,e2)+\delta<X+\delta<X+180 \qquad \text{Eq. (2-3)}$$

Based on connectivity, Eq. (2-2) and Eq. (2-3) are connected with respect to the X term and the X+180 term.

$$X+180<X-\delta<A(S2,1)<A(S2,e2)<X<A(S2,1)+\delta<A(S2,e2)+\delta<X+\delta S \qquad \text{Eq. (2-4)}$$

Based on extractability, all but the X term and adjacent terms are omitted from Eq. (2-4) to obtain Eq. (2-5), which limits the azimuth X by the first and last terms of the second area 2.

$$A(S2,e2)<X<A(S2,1)+\delta \qquad \text{Eq. (2-5)}$$

Finally, the method of deriving from Eq. (1) an equation that limits the azimuth X based on the first term and the last term of the third area 3 will be explained.

First, the first terms and last terms of areas other than third area 3 are omitted from Eq. (1) based on extractability.

$$X+180<X-\delta<X<A(S3,1)<A(S3,e3)<X-\delta+180 \qquad \text{Eq. (3-1)}$$

Based on add-subtract-ability, (δ−180) is added to Eq. (3-1).

$$X+\delta<X-180<X+\delta-180<A(S3,1)+\delta-180<A(S3,e3)+\delta-180<X \qquad \text{Eq. (3-2)}$$

As the second term (X−180) in Eq. (3-2) is the same as (X+180), the equation is rewritten.

$$X+\delta<X+180<X+\delta-180<A(S3,1)+\delta-180<A(S3,e3)+\delta-180<X \qquad \text{Eq. (3-3)}$$

Based on connectivity, Eq. (3-1) and Eq. (3-3) are connected with respect to the X term and the X+180 term.

$$X+180<X+\delta-180<A(S3,1)+\delta-180<A(S3,e3)+\delta-180<X<A(S3,1)<A(S3,e3)<X-\delta+180 \qquad \text{Eq. (3-4)}$$

Based on extractability, all but the X term and adjacent terms are omitted from Eq. (3-4) to obtain Eq. (3-5), which limits the azimuth X by the first and last terms of the third area 3.

$$A(S3,e3)+\delta-180<X<A(S3,1) \qquad \text{Eq. (3-5)}$$

Eqs. (1-5), (2-5) and (3-5) obtained in the foregoing manner play an important role in the acquisition of azimuth information in the present invention. If one of these three main equations is obtained, that equation can be used to acquire azimuth information. If two or all of the equations are obtained, still more accurate azimuth information can be acquired by determining the azimuth range that satisfies the equations simultaneously. The acquired azimuth information is output by a result output unit 14 by, for example, displaying it on a liquid crystal screen and/or announcing it audibly through a speaker or earphones.

The foregoing processing is conducted by the data processing unit 13, which is constituted by a microprocessor with numerical computation and memory capability.

The term "extractability" used in the forgoing explanation is based on the proposition that the circular series obtained by extracting three or more terms from a valid azimuth circular series composed of four or more terms and expressing them with their circular order maintained is also valid as an azimuth circular series.

The term "add-subtract-ability" is based on the proposition that the result obtained by adding (or subtracting) an arbitrary angle of rotation to all terms of a valid azimuth circular series is a valid azimuth circular series.

The term "connectivity" is based on the proposition that if a certain valid azimuth circular series includes a term a immediately followed by a term b and another valid azimuth circular series includes the term b immediately followed by the term a, then when a series formed by cutting the former azimuth circular series between a and b and a series formed by cutting the latter azimuth circular series between b and a are connected with respect to a and a, b and b, the newly formed azimuth circular series is valid as an azimuth circular series.

The method of acquiring azimuth information using the Eqs. (1-5), (2-5) and (3-5) will now be explained in detail. In the following explanation, degree is used as the unit for angles, with north defined as 0 degree and, moving clockwise, east as 90 degrees, south as 180 degrees and west as 270 degrees. Angle of elevation is defined as 0 degree at horizontal and 90 degrees at zenith.

First, the first and second planar patch antennas 11a, 1b are placed vertically (normal to the ground) to from an angle δ. Although the two antennas can be appropriately placed with consideration to conditions at the measurement site the azimuth acquisition direction and the like, they must be placed such that their sky coverage areas partially overlap and form a common area.

The angle formed between the two antennas can be measured using a variable capacitor, variable resistor or other such known angle measuring instrument that enables rotation angle to be read out as a numerical value representing voltage or the like.

Figure 4:
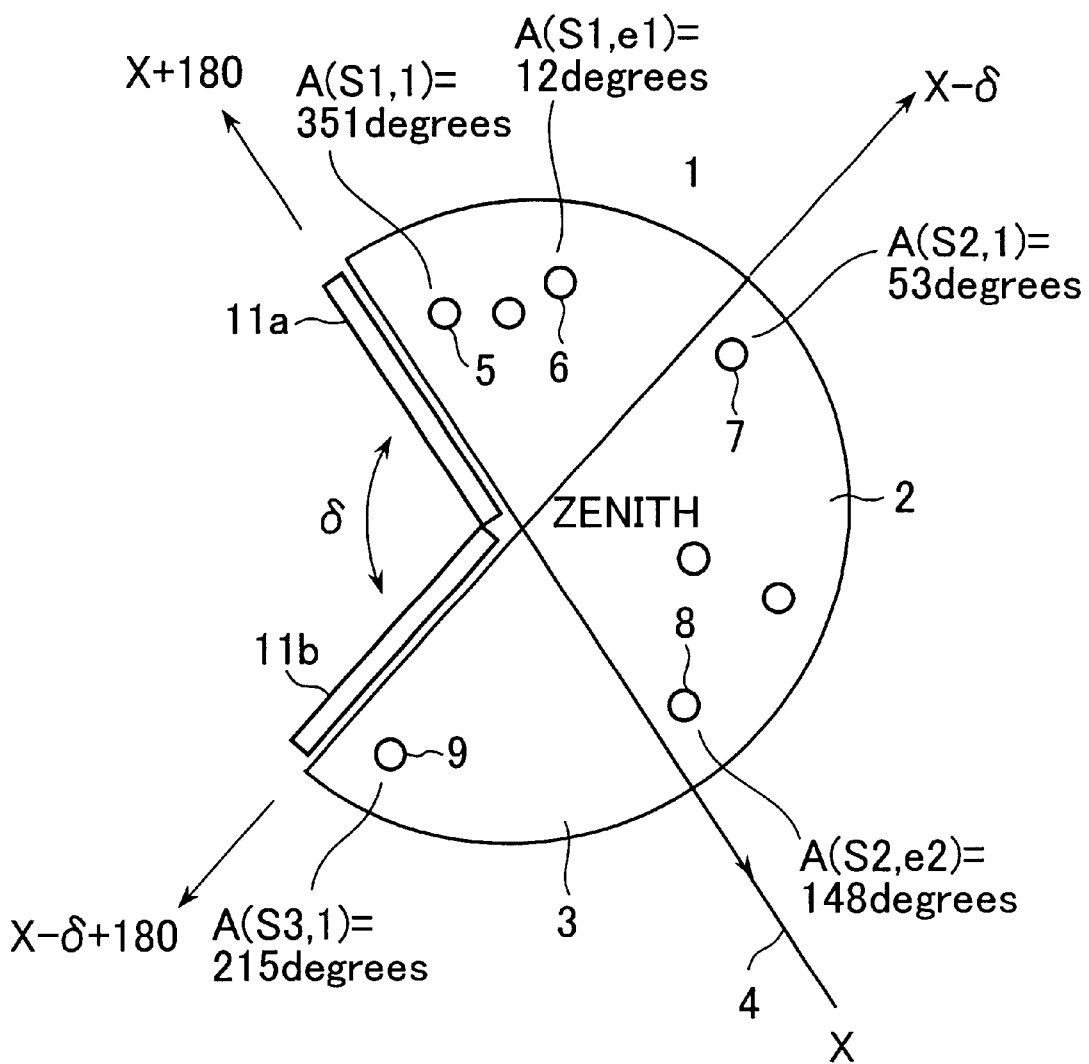
FIG. 4 is a diagram for explaining the positional relationship between the pair of antennas and space satellites when the antennas are placed to form an angle of 100 degrees.

When the angle δ formed by the antennas 11a, 11b is set at 100 degrees as shown in FIG. 4, the first area 1 is a sector with a start azimuth of X+180 degrees, end azimuth of X−100 degrees, and central angle defined clockwise of 80 degrees.

The satellites in the first area 1 are ones with which the channel state is synchronized in the first GPS receiver 12a and not synchronized in the second GPS receiver 12b. It will be assumed that three satellites having azimuths of 12 degrees, 6 degrees and 351 degrees were found to be present in this area.

The circular series of the three satellite azimuths can be expressed as 6<12<351. The central angle of the first area 1 is 80 degrees. If the angle formed clockwise between the azimuth of a certain satellite (here called A) and the azimuth of the next satellite in the clockwise direction (B) is larger than the angle obtained by subtracting the central angle of the area from 360 degrees (360−80=280 degrees, satellite A is defined as the last term and satellite B as the first term and, therefore, the 351 degrees of satellite 5 is defined as the first term A(S1, 1) and the 12 degrees of satellite 6 is defined as the last term A(S1, e1).

As the first term A(S1, 1) was found to be 351 and the last term A(S1, e1) to be 12 degrees in the foregoing manner, these are substituted into Eq. (1-5).

$$A(S1,e1)+δ<X<A(S1, 1)+180 \qquad \text{Eq. (1-5)}$$

and therefore $$120+100-180<X<351+180$$

which when rearranged gives the following equation limiting X.

$$292<X<171 \qquad (1)'$$

As shown in FIG. 4, the second area 2 is a sector with a start azimuth of X−100 degrees, end azimuth of X, and central angle defined clockwise of 100 degrees.

The satellites in the second area 2 are ones with which the channel state is synchronized in the first GPS receiver 12a and also synchronized in the second GPS receiver 12b. It will be assumed that four satellites having azimuths of 72 degrees, 53 degrees, 148 degrees and 102 degrees were found to be present in this area 2.

The circular series can be expressed as 53<72<102<148, or 148<52<72<102,or 102<148<53<72,or 72<102<148<53.

If the angle formed clockwise between the azimuth of a certain satellite (here called A) and the azimuth of the next satellite in the clockwise direction (B) is larger than the angle obtained by subtracting the central angle of the area from 360 degrees (360−100=260 degrees, satellite A is defined as the last term and satellite B as the first term and, therefore, the 53 degrees of satellite 7 is defined as the first term A(S2, 1) and the 148 degrees of satellite 8 is defined as the last term A(S2, e2).

As the first term A(S2, 1) was found to be 53 and the last term A(S2, e2) to be 148 in the foregoing manner, these are substituted into Eq. (2-5).

$$A(S2,e2)<X<A(S2, 1)+6 \qquad \text{Eq. (2-5)}$$

and therefore $$148<X<53+100$$

which when rearranged gives the following equation limiting X.

$$148<X<153 \qquad (2)'$$

As shown in FIG. 4, the third area 3 is a sector with a start azimuth of X degrees, end azimuth of X−100+180 degrees, and central angle defined clockwise of 80 degrees.

The satellites in the third area 3 are ones with which the channel state is not synchronized in the first GPS receiver 12a and is synchronized in the second GPS receiver 12b. It will be assumed that one satellite (satellite 9) having an azimuth of 215 degrees was found to be present in this area. This value is substituted into Eq. (3-5) for both A(S3, 1) and A(S3, e3).

$$A(S3,e3)+δ-180<X<A(S3,1) \qquad \text{Eq. (3-5)}$$

and therefore $$215+100-180<X<215$$

which when rearranged gives the following equation limiting X.

$$135<X<215 \qquad (3)'$$

As the azimuth range that simultaneously satisfies Eqs. (1)', (2)' and (3)', there is obtained 148<X<171.

In other words, information is obtained that the unknown azimuth X in FIG. 4 is a range of azimuths between not less than 148 degrees and not greater than 171 degrees.

The method for acquiring azimuth information when it is clear that satellite signals cannot be received from satellites in some directional areas of the whole sky because three directions are blocked by very high buildings or the like will now be explained.

Figure 5:
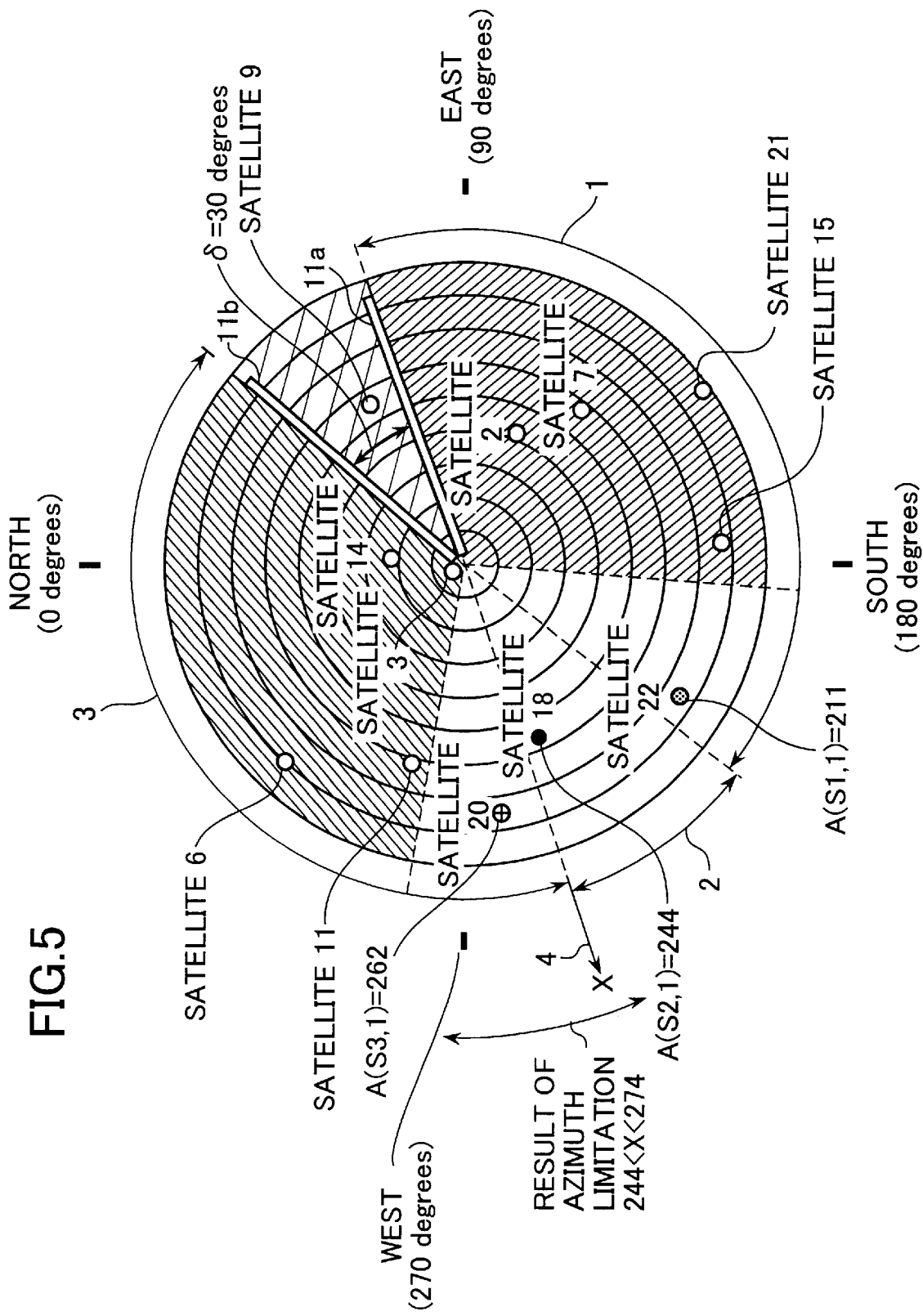
FIG. 5 is a diagram for explaining acquisition of azimuth information when the sky area from which satellite information can be obtained is limited to a sector centered on the zenith having a central angle of 100 degrees.

The case where, as shown in FIG. 5, the sky is open only at a sector centered on the zenith having a central angle of 100 degrees will be considered. The antennas 11a, 11b are, for example, placed so that δ is 30 degrees and the common second area 2 is formed in the direction that the sky is open. (It is assumed that, as shown in FIG. 5, the area of the hatched sectors represent the sky area in which direction satellite signals cannot be received due to blockage of high-rise buildings or the like.)

Next, the GPS receivers connected to the antennas are operated and an attempt is made to synchronize with and decode satellite signals of the GPS satellites in the sky hemisphere and to determine position.

Although six satellites are actually present in the first area 1 and the common second area 2 (which together correspond to the coverage area of the first planar patch antenna area), signals from four of them cannot be received (synchronized with) because they are hidden by buildings. (However, the observer cannot distinguish whether this is because the satellite is in a sky area in which the antenna does not have sensitivity or because it is blocked by a ground feature.) As a result, signals can be received from only two satellites (satellites 18 and 22), one of which is assumed to be a satellite present in the common second area 2.

In the drawing, the hatching indicates regions from which signals cannot be received because they are blocked by buildings, the gray circles indicate satellites found to be present in the first area 1, the black circles indicate satellites found to be present in the second area 2, the white circles with a plus sign indicate satellites found to be present in the third area 3, and the white circles indicate satellites that were not found to be present in any of the areas 1, 2 and 3. The outermost solid circle indicates an angle of elevation of 0 degrees and the remaining concentric solid circles indicate angles of elevation increasing inwardly in increments of 10 degrees.

Although six satellites are also actually present in the third area 3 and the common second area 2 (which together correspond to the coverage area of the second planar patch antenna area), signals from four of them cannot be received because they are hidden by buildings. (However, the observer cannot distinguish whether this is because the satellite is in a sky area in which the antenna does not have sensitivity or because it is blocked by a ground feature.) As a result, signals can be received from only two satellites (satellites 18 and 20), one of which is assumed to be a satellite present in the common second area 2.

Since one satellite is thus present in each of the three areas 1, 2 and 3, it follows that First term=Last term and the following information can be acquired from the respective areas.

$$\begin{cases} A(S1, 1) = A(S1, e1) = 211 \\ A(S2, 1) = A(S2, e2) = 244 \\ A(S3, 1) = A(S3, e3) = 262 \end{cases}$$

which in the order listed are satellite azimuth data for the first area 1, second area 2 and third area 3.

These data and $\delta=30$ are substituted into the following three main equations (1-5), (2-5) and (3-5).

$$\begin{cases} A(S1, e1) + \delta < X < A(S1, 1) + 180 & \text{Eq. (1-5)} \\ A(S2, e2) < X < A(S2, 1) + \delta & \text{Eq. (2-5)} \\ A(S3, e3) + \delta - 180 < X < A(S3, 1) & \text{Eq. (3-5)} \end{cases}$$

Substitution of the foregoing data in the main equations gives the following equations:

$$\begin{cases} 211 + 30 < X < 211 + 180 \\ 244 < X < 244 + 30 \\ 262 + 30 + 180 < X < 262 + 30 \end{cases}$$

Rearranging these equations gives the following:

$$\begin{cases} 241 < X < 31 \\ 244 < X < 274 \\ 112 < X < 292 \end{cases}$$

As the azimuth range that simultaneously satisfies these three equations, there is obtained $244<X<274$. In other words, the azimuth X being sought is within the range of 244 degrees to 274 degrees.

The observer decides the value of $\delta$ with consideration to the following tradeoff.

The value of $\delta$ and the value of the central angle of the common second area 2 are the same. If even a single satellite is picked up in the common second area 2, therefore, the azimuth is immediately limited to the range of $\delta$. This means that setting $\delta$ to a narrow value has the advantage of enhancing the accuracy of the result. If $\delta$ is set to a narrow value, however, the central angle of the common second area 2 becomes narrow and it may be impossible to pick up even a single satellite.

Consideration will now be given to the number of usable satellites in the sky, which depends on the observer's location and the time of day. At Tokyo, Japan, a city in the middle latitudes, the number of satellite that can actually be used for GPS is known to be between 8 and 12 at all times. It is reasonable to conclude, therefore, that on average 10 satellites are available for use. Assume, for example, that the usable sky area as viewed from the observer's location is a sector area having a central angle of only 36 degrees. Based on statistical probability, the number of usable satellites that can be expected to be present in the narrow 36-degree sky sector at the observer's location is one (10 satellites×36 degrees/360 degrees=1 satellite).

If the angle $\delta$ between the two antennas is set at 36 degrees and the common area having a central angle of 36 degrees is aligned with the usable sky area, the probability of picking up a signal from a single satellite present in the area will be high. In the measurement by the present invention, limitation to an azimuth range of $\delta$ is generally instantaneously possible if even a single satellite is picked up. (The azimuth is immediately limited to within the span of 6 if a single satellite is picked up because in Eq. (2-5), i.e., $A(S2, e2)<X<A(S2, 1)+6$ the first term and last term become equal (e2=1) to give $A(S2, 1)<X<A(S2, 1)+6$). Thus, even in an environment where only a narrow sky area is available for use, the present invention can nevertheless be expected to enable azimuth limitation on the order of around 36 degrees at a high probability.

The usable sky area is seldom limited to such a poor condition as 36 degrees and is usually considerably broader. When broader, the number of satellites that can be picked up is naturally greater. This means that number of terms (e2) in Eq. (2-5) increases. In this case, azimuth limitation narrower than 6 is possible from Eq. (2-5) alone, while even more accurate azimuth limitation is likely to be possible owing to Eqs. (1-5) and (3-5) also being usable thanks to the presence of S1 and S3 in the first area 1 and third area 3.

Figure 6:
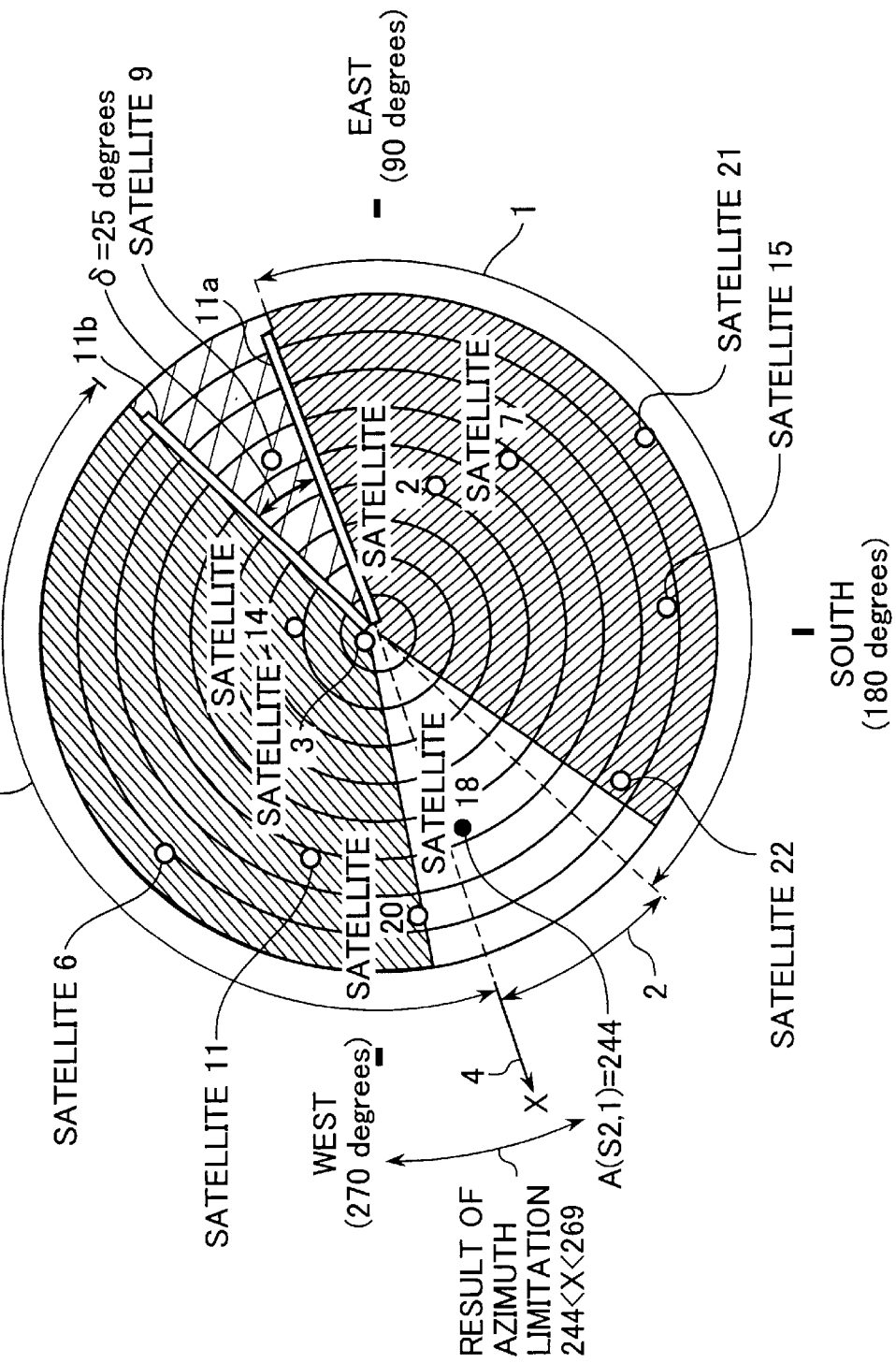
FIG. 6 is a diagram for explaining acquisition of azimuth information when the sky area from which satellite information can be obtained is limited to a sector centered on the zenith having a central angle of 45 degrees.

Next, consider the case where, as shown in FIG. 6, the sky area in which satellite information can be acquired (where the sky is open) is limited by buildings or the like to only at a sector centered on the zenith having a central angle of 45 degrees. (It is assumed that, as shown in FIG. 6, the area of the hatched sectors represent the sky area in which direction satellite signals cannot be received due to blockage of high-rise buildings or the like.) Assume that for some reason the observer wants to limit the azimuth information to within a span of 25 degrees. In this case, the observer places the antennas 11a, 11b so that $\delta=25$ degrees, for example, in order to form the common second area 2 in the direction of the sky area where measurement is possible. The operator then causes the GPS receivers connected to the antennas to attempt to synchronize with and decode signals from satellite present in the sky, and also to determine position.

If a satellite is fortunately found to be present in the second area 2, the azimuth obtained (244 degrees) and $\delta=25$ are substituted into the main equation for the second area 2. As only one satellite (satellite 18) is present in this case, too, the first term $A(S2, 1)$ and the last term $A(S2, e2)$ are the same. Therefore, $$244<X<244+25$$

which when rearranged gives $$244<X<269$$

In other words, the desired azimuth X falls between 244 degrees and 269 degrees.

This can be generalized as follows. Considering a poor environment in which only one satellite can be picked up, if the single satellite is picked up in the common second area 2, the azimuth limitation width is δ degrees. (The azimuth is immediately limited to within the span of δ degrees if even a single satellite is picked up because in Eq. (2-5), i.e., A(S2, e2)<X<A(S2, 1)+δ, the first term and last term become equal (e2=1) to give A(S2, 1)<X<A(S2,1)+δ)).

If the single satellite is picked up in the first area 1, the azimuth limitation width is 180−δ degrees. (The azimuth can be seen to be immediately limited to within the span of 180−δ degrees if even a single satellite is picked up because in Eq. (1-5), i.e., A(S1, e1)+δ<X<A(S1, 1)+180, the first term and last term become equal (e1=1) to give A(S1, 1)+δ<X<A(S1, 1)+180).

If the single satellite is picked up in the third area 3, the azimuth limitation width is again 180−δ degrees. (The azimuth is can be seen to be immediately limited to within the span of 180−δ degrees if even a single satellite is picked up because in Eq. (3-5), i.e., A(S3, e3)+δ−180<X<A(S3, 1), the first term and last term become equal (e3=1) to give A(S3, 1)+δ−180<X<A(S3, 1)).

These are obviously superior to the results that would be obtained with a configuration not having the common area.

This is clear from the fact that if δ is set at zero (no common area exists), the azimuth limitation width is 180 degrees both when the single satellite is picked up in the first area 1 and when it is picked up in the third area 3 (this corresponding the case of substituting e1=1 and δ=0 into Eq. (1-5)). In other words, establishment of the common second area 2 particularly enhances the azimuth limitation capability under conditions where only one satellite can be picked up.

As is clear from the foregoing explanation, the method for acquiring azimuth information according to the present invention effectively enables acquisition of azimuth information even at a location where the sky is partially blocked or a location where the likelihood of blocking by buildings is obvious.

In fact, azimuth information can be acquired even at a location where most of the sky is blocked, insofar as a signal can be received from at least one satellite present in the unblocked sky area.

Since the two patch antennas do not have to be placed in parallel, moreover, they can be installed, for example, on a mobile unit having a streamlined member mounted on its nose (e.g. a motorcycle equipped with a streamlined cowl) to enable constant acquisition of azimuth information during driving.

As explained in the foregoing, in the method for acquiring azimuth information according the present invention, first and second planar patch antennas are disposed at an angle to each other such that their sky coverage areas partially overlap, thereby dividing the antenna sky coverage area into an area covered by only the first antenna, an area covered only by the second antenna and a common area covered by both the first and second antennas, whereby azimuth limitation information can be effectively acquired insofar as a signal can be received from at least one satellite present in at least one of the three areas. Azimuth limitation information can therefore be effectively acquired even at a location where most of the sky is blocked.

When one or more satellites are present in two or more of the areas, azimuth information can be acquired from each of these areas, making it possible to acquire still more accurate azimuth information by taking the common product of sets of the azimuths to limit them to a single azimuth.

What is claimed is:

1. A method for acquiring azimuth information comprising:
    a step of vertically disposing a pair of planar antennas each having a hemispherical antenna pattern at an angle to each other such that their sky coverage areas partially overlap;
    a step of detecting the angle formed between the antennas;
    a step of causing a GPS receiver connected to each antenna to attempt reception of signals transmitted by GPS satellites in the sky coverage area of the respective antenna to which the GPS receiver is connected;
    a step of comparing the satellite signals acquired and discriminating in which of three separate sky coverage areas the satellite that transmitted each signal is present;
    a step of in each of the three areas creating a clockwise series of satellite azimuths and extracting the azimuth of the first term and the azimuth of the last term; and
    a step of limiting the azimuth of a direction based on the azimuth of the first term and the azimuth of the last term in at least one area and the angle formed between the two antennas.

2. A method for acquiring azimuth information according to claim 1, wherein said at least one area is a common area where the sky areas of the two antennas overlap.

3. A method for acquiring azimuth information according to claim 1 or 2, wherein the presence of a single satellite in said at least one area makes the azimuth of the first term and the azimuth of the last term the same.

4. A method for acquiring azimuth information according claim 1, wherein azimuth limitation results acquired in multiple areas are limited to a single azimuth by taking a common product of sets.

* * * * *

UNITED STATES PATENT AND TRADEMARK OFFICE
CERTIFICATE OF CORRECTION

PATENT NO. : 6,718,264 B2
DATED : April 6, 2004
INVENTOR(S) : Takahashi

It is certified that error appears in the above-identified patent and that said Letters Patent is hereby corrected as shown below:

<u>Title page,</u>
Item [30], Foreign Application Priority Data, should read -- Mar. 28, 2001 (JP)
………………… 2001-093965 --

Signed and Sealed this

Twenty-ninth Day of June, 2004

JON W. DUDAS
*Acting Director of the United States Patent and Trademark Office*